United States Patent
Burdick et al.

(12)

(10) Patent No.: US 6,576,048 B1
(45) Date of Patent: *Jun. 10, 2003

(54) USE OF HIGH BULK DENSITY METHYLCELLULOSES IN AQUEOUS FLUID POLYMER SUSPENSIONS

(76) Inventors: Charles Lee Burdick, 307 Walker Rd., Landenberg, PA (US) 19350; Thomas J. Podlas, 9 Paddington Ct., Hockessin, DE (US) 19707

( * ) Notice: Subject to any disclaimer, the term of this patent is extended or adjusted under 35 U.S.C. 154(b) by 0 days.

This patent is subject to a terminal disclaimer.

(21) Appl. No.: 08/121,402

(22) Filed: Sep. 14, 1993

(51) Int. Cl.⁷ .............................. C08L 1/00; C08L 1/26; C08L 3/02
(52) U.S. Cl. ............................ 106/172.1; 106/189.1; 106/198.1; 106/162.8
(58) Field of Search .................. 106/176, 194, 106/197.1

(56) References Cited

U.S. PATENT DOCUMENTS

| 4,069,062 A | * | 1/1978 | Burge | 106/93 |
|---|---|---|---|---|
| 4,313,765 A | * | 2/1982 | Baird et al. | 106/197.1 |
| 4,558,079 A | * | 12/1985 | Desmarais | 106/197.1 |
| 5,028,263 A | * | 7/1991 | Burdick | 106/194 |
| 5,039,341 A | * | 8/1991 | Meyer | 106/197.1 |
| 5,080,717 A | * | 1/1992 | Young | 106/197.1 |
| 5,228,908 A | * | 7/1993 | Burdick et al. | 106/194 |
| 5,228,909 A | * | 7/1993 | Burdick et al. | 106/194 |
| 5,258,069 A | * | 11/1993 | Knechtel et al. | 106/197.1 |
| 6,025,311 A | | 2/2000 | Clarke et al. | 510/121 |

* cited by examiner

Primary Examiner—Mark L. Bell
Assistant Examiner—Patricia L. Hailey

(57) ABSTRACT

An aqueous fluidized polymer suspension is comprised of at least 20% by total weight of the suspension of at least one member selected from methylcellulose, methylhydroxypropylcellulose and methylhydroxyethylcellulose having a bulk density of 0.30 g/ml or greater dispersed in an aqueous solution of at least one salt dissolved therein. These suspensions have many industrial uses; for example, they can be used for joint compound manufacture, tile cement thickening, food additives, adhesives, and in many other water based systems.

6 Claims, No Drawings

USE OF HIGH BULK DENSITY METHYLCELLULOSES IN AQUEOUS FLUID POLYMER SUSPENSIONS

FIELD OF THE INVENTION

This invention relates to fluid polymer suspensions that contain water, a dissolved salt, and a water-soluble polymer in a suspended form. In particular, this invention relates to suspensions of methylcellulose (MC), methylhydroxypropylcellulose (MHPC) and methylhydroxyethylcellulose (MHEC) in aqueous salt solutions.

BACKGROUND OF THE INVENTION

Prior to the present invention, methylcellulose derivatives such as MC, MHPC, and MHEC have traditionally been handled in their dry, particulate form. Problems associated with dry methylcellulose derivative polymers include undesirable dust generation, poor dispersibility when added to aqueous systems, and undesirably long dissolution times.

The dust associated with dry, particulate methylcellulose derivatives present the same conventional handling problems as are encountered with other particulate water soluble polymers. When added to an aqueous system, dry methylcellulose derivatives tend to agglomerate to form clumps. Agglomeration can be reduced in many cases by adding the polymer to the aqueous system slowly with agitation. Slow dissolution, however, substantially reduces the speed of manufacturing operations.

Several formulations exist in the prior art that describe suspension systems of various water soluble polymers that avoid the above mentioned problems. For example, U.S. Pat. No. 4,283,229 (Girg et al.) discloses that stable suspensions of nonionic cellulose ethers can be prepared in a solution of 4 to 12% electrolyte if alumina is added to the suspension. Prior art aqueous fluid suspensions of water soluble polymers are further described in U.S. Pat. Nos. 4,883,536 and 4,883,537. U.S. Pat. No. 4,883,536 discloses the use of ammonium salts such as diammonium sulfate for preparing fluid suspensions of water soluble polymers. U.S. Pat. No. 4,883,537 discloses the use of concentrated aqueous potassium carbonate for preparing suspensions of sodium carboxymethylcellulose.

SUMMARY OF THE INVENTION

The present invention is directed to an aqueous suspension comprising at least 20% by total weight of the suspension, of methylcellulose derivatives having a bulk density of 0.3 g/ml or greater dispersed in an aqueous solution of at least one salt dissolved therein.

This invention also relates to a method of preparing a fluidized suspension of methylcellulose derivatives in aqueous salt solutions with a solids content of 20% by weight or greater of the suspended water-soluble polymer by using a methylcellulose derivative polymer having a bulk density of 0.3 g/ml or greater.

DETAILED DESCRIPTION OF THE INVENTION

It has been discovered that the proportion of water soluble methylcellulose derivatives that can be suspended in any given aqueous salt solution is dependent upon the bulk density of the polymer in its dry pre-suspension state. It was found that samples of methylcellulose derivatives with a bulk density of greater than 0.30 could be suspended in aqueous salt solutions at a polymer content of 20% by weight or higher to form fluid pourable suspensions. Conversely, samples with a bulk density of less than 0.30 formed thick pastes when added to aqueous salt solutions at a water soluble polymer content of 20% by weight or greater.

The higher bulk density methylcellulose derivatives are therefore much more useful than the lower bulk density polymers for preparing fluid polymer suspensions in aqueous media since it is desired to have as high a water soluble polymer solids content as possible, while still allowing the fluid to be pourable. The higher the bulk density of the methylcellulose derivative, the better are the suspension properties. It is also desirable to prepare fluid polymer suspensions (FPS) with as high as possible a ratio of the water soluble polymer to the salt in the fluid suspension. A high water soluble polymer/salt ratio in fluid polymer suspension was found to translate into better performance properties in industrial applications to which these products are added compared to fluid polymer suspensions in which the ratio of the suspended water soluble polymer to FPS salt content was lower.

Generally, a large number of salts (i.e., organic or inorganic) can be used in this invention as long as the salt is at least soluble to the extent of 4 grams per 100 cubic centimeters as shown in the *Handbook of Chemistry and Physics,* published by CRC Press, Inc., 55th edition, pages B-63 through B-156. In practice, salts or combinations of salts of di- or tri-basic acids are used at lower levels (i.e., 4–15 weight percent of slurry system) while salts or combination of monobasic acids are used at higher levels (i.e., 20 weight percent or greater of slurry system) to effect preparation of a stable methylcellulose derivative suspension.

The present invention, fluid polymer suspensions of high bulk density methylcellulose derivatives in aqueous salt solution, has industrial applicability for uses such as for joint compound manufacture, tile cement thickening, food additives, adhesives and in other water based systems.

The variation in bulk densities among different samples of methylcellulose derivatives can often be explained by the processes employed to prepare these polymers. A wide variety of methylcellulose derivatives of varying bulk densities is generally available in the marketplace.

Standard Procedures

1. "Pourability" of a Fluidized Polymer Suspension, as used in the following Examples, is determined by placing 100 grams of the suspension in question into a 4 ounce wide mouth jar, shaking well for 60 seconds, and then inverting the jar so that the opening of the jar protrudes above a catch vessel. A "pourable" suspension is one that discharges at least 20% of the weight of the suspension from its original container into the receiving vessel in a period of less than 60 seconds.

Using the test procedure for pourability, it was corroborated that the suspensions named as being "fluid pourable suspensions" in the examples below, were "pourable" under the conditions cited above while those polymer suspensions that were described as "thick pastes" were found to be "not pourable" in that they did not discharge any of their starting weight into the receiving vessel utilizing the pourability test method.

2. Bulk Density of Methylcellulose Derivatives

A weighed sample is placed in a graduated cylinder and tamped until the material reaches a constant volume. This volume is read and density calculated.

Apparatus
1. Laboratory Bulk Density Tester.
Procedure
1. Thoroughly mix the sample to assure uniformity.
2. Weigh out a measured quantity of sample and pour into a clean, dry graduated cylinder.
3. The cylinder should be tapped onto a hand surface for 20 minutes to allow settling of the sample in the tester, set the time for 20 minutes and turn on.
4. When the 20 minutes have been completed, position the graduaated cylinder to obtain a level reading. Read the volume occupied in milliliters.
Calculation
1. Divide the number of grams weighed (50 g) by the volume occupied in ml; this gives Bulk Density in g/ml.
2. Report the result to the nearest 0.01 unit.
3. Alternatively, use Bulk Density as reported by manufacturer for particular methylcellulose derivative.

EXAMPLE 1

Several samples of methylhydroxypropylcellulose were compared for their utility in preparing aqueous fluid polymer suspensions. A summary of these samples and their physical characteristics is shown in Table 1.

TABLE 1

Physical Properties of MHPC Samples

| MHPC Type* | Commerical Lot # | 1% Brookfield Viscosity, cps | Particle Size % −200 Mesh | Bulk Density |
|---|---|---|---|---|
| Culminal 20,000PFR MHPC | 6962-0200 | — | 26.4 | 0.27 |
| Culminal 20,000PFR MHPC | 7880-7225 | 1460 | 22.4 | 0.38 |
| Culminal 20,000PFR MHPC | 4849-4312 | 2040 | 56.4 | 0.36 |
| Culminal 20,000PFR MHPC | 9098-8007 | 1600 | 58.2 | 0.29 |
| Culminal 20,000PFR MHPC | 6853-0186 | 1920 | 57.0 | 0.24 |
| Culminal 20,000PFR MHPC | 7088-0219 | 2000 | 58.8 | 0.25 |
| Methocel 856S MHPC | 88011302JS | 2290 | 70.0 | 0.49 |
| Culminal 20,000PFR MHPC | 7117-5037 | 680 | 57.4 | 0.34 |
| Methocel 240S MHPC | 88042902W | 1500 | 71.9 | 0.31 |

*Culminal ® MHPC is available from Aqualon Company, Wilmington, Delaware.
Methocel ® MHPC is available from Dow Chemical Co., Midland, Michigan Each of the above nine samples of MHPC shown in Table 1 was added to an aqueous system containing sodium formate in an attempt to prepare Fluid Polymer Suspensions. In these tests, 52.2 parts by weight of water were added to a mixing vessel followed by 0.2 parts by weight of xanthan gum and stirring was employed for 2 hours to dissolve the xanthan. After the xanthan had dissolved in the fluid medium, 27.5 parts by weight of sodium formate were added to the xanthan solution and stirred until the salt had dissolved. At this point, it was attempted to add 20 parts by weight of various MHPC water soluble polymer samples to the aqueous sodium formate solutions. 0.1 part of Proxel® GXL preservatives (available from ICI) was added to each of the suspensions. A summary of the results observed is shown in Table 2.

TABLE 2

Sodium Formate Fluid Suspension Results With Various MHPC Samples at 20% MHPC Solids

| MHPC Type | Commerical Lot # | MHPC Bulk Density | FPS Characteristics | MHPC/Salt Ratio |
|---|---|---|---|---|
| Culminal 20,000PR MHPC | 6962-0200 | 0.27 | Thick Paste | 0.73 |
| Culminal 20,000P MHPC | 7880-7225 | 0.38 | Fluid, Pourable | 0.73 |
| Culminal 20,000PFR MHPC | 4849-9312 | 0.36 | Fluid, Pourable | 0.73 |
| Culminal 20,000PFR MHPC | 9098-8007 | 0.29 | Thick, Not Quite Pourable | 0.73 |
| Culminal 20,000PFR MHPC | 6853-0186 | 0.24 | Thick Paste | 0.73 |
| Culminal 20,000PFR MHPC | 7088-0219 | 0.25 | Thick Paste | 0.73 |
| Methocel 856S MHPC | 88011302JS | 0.49 | Very Fluid, Pourable | 0.73 |
| Culminal 20,000PFR MHPC | 7117-5037 | 0.34 | Fluid, Pourable | 0.73 |
| Methocel 240S MHPC | 88042902W | 0.31 | Viscous, Pourable | 0.73 |

It was found that in the case where MHPC samples with bulk densities of less than 0.30 were added to the sodium formate solution, very thick pastes were obtained. These pastes would have no practical utility on an industrial scale, since controlled quantitative addition of this type of product to any given industrial system would not be feasible.

By comparison, it was found in the case where the bulk density of the MHPC samples exceeded 0.30 that addition of these water soluble polymer samples to the sodium formate solution produced fluid pourable suspensions of the water soluble polymer. The fluid nature of these latter fluid polymer suspensions containing MHPC with a bulk density of greater than 0.3 would allow these products to have utility in industrial applications as is shown in subsequent examples.

The finding that different MHPC samples with essentially equivalent chemical composition, but with varying bulk densities, behaved dramatically different with respect to allowable solids loading in an aqueous fluidizing medium, was a completely unexpected result. While it is predictable that differences in particle size might account for changes in solids loading seen in typical suspensions such as in mineral slurries, in the present case of fluid polymer suspensions of MHPC it was noted that the samples of Culminal 20,000PFR with similar particle size distributions (PSD) as shown in Table 1 gave much different suspension results and thus the PSD variable did not account for the findings observed.

Comparative Example A

It was attempted to prepare fluid polymer suspensions of each of the samples from Table 1 in a low active MHPC solids content fluid polymer suspension. In this case, 57.2 parts of water were added to a mixing vessel and then 0.2 part by weight of xanthan gum was added to the water and stirred to dissolve. After the xanthan had dissolved, 27.5 parts by weight of sodium formate were added to the xanthan solution and stirred to dissolve. After the sodium formate had dissolved, 15 parts by weight of a given MHPC sample from Table 1 were added to the aqueous sodium formate solution and stirred to disperse. In a final step, 0.1 part by weight of the preservative Proxel GXL was added to the mixture and stirred.

It was observed in this latter set of tests that fluid pourable suspensions were obtained in all cases as shown in Table 3. This established that low bulk density MHPC could be employed to form fluid polymer suspension products, however, only at a relatively low MHPC solids content of less than 20% by weight. As shown in Table 3, the MHPC/sodium formate salt ratio was much lower in the case of these latter suspensions compared to those successful 20% MHPC fluid polymer suspension of high bulk density MHPC shown in Table 2.

The requirement of a relatively low MHPC/salt ratio in preparing fluid polymer suspensions of low bulk density MHPC was subsequently found to have adverse consequences in an industrial application as is shown in the following example.

TABLE 3

Sodium Formate Fluid Suspension Results
With Various MHPC Samples at 15% MHPC Solids Loading

| MHPC Type | Commerical Lot # | MHPC Bulk Density | FPS Characteristics | MHPC/Salt Ratio |
|---|---|---|---|---|
| Culminal 20,000PR MHPC | 6962-0200 | 0.27 | Very Fluid, Pourable | 0.55 |
| Culminal 20,000P MHPC | 7880-7225 | 0.38 | Very Fluid, Pourable | 0.55 |
| Culminal 20,000PFR MHPC | 4849-9312 | 0.36 | Very Fluid, Pourable | 0.55 |
| Culminal 20,000PFR MHPC | 9098-8007 | 0.29 | Very Fluid, Pourable | 0.55 |
| Culminal 20,000PFR MHPC | 6853-0186 | 0.24 | Very Fluid, Pourable | 0.55 |
| Culminal 20,000PFR MHPC | 7088-0219 | 0.25 | Very Fluid, Pourable | 0.55 |
| Methocel 856S MHPC | 88011302JS | 0.49 | Very Fluid, Pourable | 0.55 |
| Culminal 20,000PFR MHPC | 7117-5037 | 0.34 | Very Fluid, Pourable | 0.55 |
| Methocel 240S MHPC | 88042902W | 0.31 | Very Fluid, Pourable | 0.55 |

EXAMPLE 2

Selected Fluid Polymer Suspension samples from the preceding Tables 2 and 3 were employed to prepare joint compound mixtures. In these tests, a mixture of 28.5 parts by weight water, 62.75 parts by weight limestone (Ga. White No. 9—Ga. Marble Co.), 1.85 parts by weight attapulgite (GEL B, Floridin Corp.), 2.75 parts of mica P80K, 2.50 parts by weight Ucar 133 polyvinylacetate latex (Union Carbide), 0.4 part by weight propylene glycol, and 0.05 part by weight biocide were added to a Hobart mixer, then 0.40 part by weight of MHPC, in an FPS form, was added to the mixture and stirred 10 minutes to form a final joint compound.

In one joint compound test, the 20% MHPC Fluid Polymer Suspension of Methocel 240S from Table 2 was employed as a thickener for the joint compound. In a comparative case, the 15% MHPC Fluid Polymer Suspension of Methocel 240S from Table 3 was employed as an additive to the joint compound. In both of these tests the same net total MHPC dosage was added to the joint compound. Thus, in the case of the 20% MHPC FPS, a total of 2 parts of the suspension was added to the joint compound, while in the case of the 15% MHPC sample of Methocel 240S from Table 3, a total of 2.66 parts by weight of the FPS or 33% more was added to the joint compound.

In the case where 2.66 parts by weight of the 15% MHPC FPS was employed as a joint compound additive, 0.38 parts of water was withheld from the joint compound formulation given above. This had the effect that the total amount of water present in the joint compound prepared with the 15% MHPC fluidized polymer suspension was the same as in the comparative case that employed 2.0 parts of 20% MHPC suspension.

These two joint compound products were compared for performance properties using standard procedures known to the industry.

The degree of adhesion of joint compound to joint compound tape is a critical property that is measured for these products. The two joint compounds prepared according to the procedures given above were each measured for their adhesion to joint compound tape by a standard method used in the construction industry. In these lab tests, a thin layer of joint compound, approximately ⅛ inch in thickness, was first spread on a sample of gypsum wall board, then a 5 to 6 inch length of joint compound tape was embedded in the joint compound with a putty knife. The joint compound was allowed to dry under 50% relative humidity conditions at 20° C. for 24 hours. After this time had elapsed, it was attempted to remove the tape from the joint compound by peeling the tape away from the surface.

It is typically observed with this test that some of the tape peels away cleanly from the dried joint compound surface to expose a fibre-free surface, while other portions of the tape fibers remain stuck to the surface. The degree of adhesion is measured by visually estimating the proportional area of the joint compound surface that is covered with adhered tape fibers versus the area of surface that is clear of all tape fibers. It is desired that the joint compound tape remain adhered to the joint compound surface to an extent of greater than 50%.

Of the two above joint compounds, the one prepared with a 20% MHPC suspension exhibited significantly higher adhesion to joint compound tape than the comparative joint compound prepared with a 15% MHPC suspension. These results are shown in Table A.

TABLE A

Relative Adhesion of Joint Compounds
Prepared with Methocel 240S Suspensions

| Joint Compound Thickener | Joint Compound Adhesion |
|---|---|
| 20% Methocel 240S suspension from Table 2 | 85% |
| 15% Methocel 240S suspension from Table 3 | 45% |

This example thus established that a MHPC solids suspension of 20% or greater is desirable for improved utility in a given industrial application. The reason for this improved performance of the higher solids MHPC suspension is thought to derive from the higher polymer/salt ratio of these suspensions compared to the 15% MHPC solids suspensions. It is believed in the case of the lower polymer/salt ratio suspensions, at 15% active MHPC, that the higher net quantity of salt added to the joint compound interferes with the joint compound adhesion property.

EXAMPLE 3

It was attempted to prepare fluid polymer suspensions of MHPC in an aqueous salt system that contained sodium chloride as the dissolved salt. In this example, 54.7 parts by weight of water were added to a mixing vessel then 0.2 part by weight of xanthan gum was added and stirred to dissolve. After the xanthan had dissolved, 25 parts by weight of sodium chloride were added to the water and stirred to dissolve. After the sodium chloride had dissolved it was attempted to add 20 parts by weight of MHPC to the sodium chloride solution. Finally, 0.1 part of Proxel GXL were added. The MHPC samples selected for testing in this experiment are shown in Table 4.

TABLE 4

Sodium Chloride Fluid Suspension Results
With Various MHPC Samples at 20% MHPC

| MHPC Type | Commerical Lot # | MHPC Bulk Density | FPS Characteristics | MHPC/Salt Ratio |
|---|---|---|---|---|
| Culminal 20,000PFR MHPC | 7117-5037 | 0.34 | Fluid, Pourable | 0.8 |
| Culminal 20,000PFR MHPC | 6853-0186 | 0.24 | Thick Paste | 0.8 |
| Culminal 20,000PFR MHPC | 4849-9312 | 0.36 | Fluid, Pourable | 0.8 |
| Culminal 20,000PFR MHPC | 9098-8007 | 0.29 | Thick, Does Not Flow | 0.8 |

It was found in these tests that the MHPC samples with a bulk density of greater than 0.3 each yielded a fluid pourable suspension upon addition to the aqueous sodium chloride medium. By comparison, the MHPC samples with bulk densities less than 0.3 each resulted in thick unusable pastes.

This example established that the conclusion regarding the use of high bulk density MHPC applied for salt systems other than sodium formate. It is evident therefore that the desirability of employing high bulk density MHPC in fluid polymer suspensions applies for a broad variety of aqueous salt systems.

EXAMPLE 4

In Examples 1–3 of MHPC fluid polymer suspensions, monovalent salts were employed in the aqueous suspending medium. The present example shows that it is also possible to prepare fluid polymer suspensions in aqueous media that contain salts of di- and tri-basic acids. In these latter systems, it has been found that lower overall salt concentrations are possible to prepare the FPS formulations than is typically found with monovalent salts. It was sought to determine whether the same conclusions regarding bulk density of MHPC would apply in these latter systems.

In the tests conducted 65 parts by weight of water were added to a mixing vessel then 15 parts by weight of tri-sodium citrate was added and stirred to dissolve. After the tri-sodium citrate were dissolved, 20 parts by weight of MHPC were added to the aqueous solution and stirred to disperse. The MHPC samples evaluated included Culminal 20,000 PFR lots 7117-5037 and 6853-0186 from Table 1 above. The FPS results obtained in these tests are shown in Table 5. It was found that the higher bulk density MHPC sample yielded a fluid pourable suspension while the lower bulk density MHPC sample yielded a thick paste. These two dispersions contained no stabilizing agent and thus the dispersed MHPC particles, in the case of lot 7117-5037, required agitation to prevent them from settling. A stable suspension of the MHPC obviously could have been obtained through the use of a stabilizer such as xanthan gum.

TABLE 5

Tri-Sodium Citrate Fluid Suspension Results
With MHPC Samples at 20% MHPC Solids Loading

| FPS MHPC Type | Commerical Lot # | MHPC Bulk Density | FPS Characteristics | MHPC/Salt Ratio |
|---|---|---|---|---|
| Culminal 20,000PFR MHPC | 7117-5037 | 0.34 | Fluid, Pourable | 1.33 |
| Culminal 20,000PFR MHPC | 6853-0186 | 0.24 | Thick Paste | 1.33 |

The results of this example were analogous to the results observed in prior examples. In this case, however, it was demonstrated that MHPC with a bulk density of greater than 0.3 was of utility for preparing fluid polymer suspensions of 20% MHPC or greater in aqueous systems containing a multivalent salt, while a bulk density of less than 0.3 was not.

EXAMPLE 5

Additional fluid polymer suspension experiments were conducted with various aqueous salt systems to further demonstrate the present invention. The three additional salt systems evaluated as part of this present work included potassium chloride, sodium sulfate, and dibasic potassium phosphate.

In each of these experiments, xanthan gum was added to water and stirred for a sufficient length of time to dissolve, then a given salt in question was added to the xanthan solution and stirred to dissolve. After the salt had dissolved, either a high bulk density MHPC sample or a low bulk density MHPC sample was added to the salt solution and stirred to disperse.

Pourability tests with the resultant dispersions were then conducted. The results of these experiments are shown in Tables 6–8 below.

It was found in these tests that fluid pourable suspensions were observed for only the high bulk density MHPC samples in each of the salt systems studied. By comparison, however, the low bulk density MHPC samples, when added to these same salt systems, yielded mixtures that were not fluid pourable suspensions, but were instead immobile pastes. These results served to further demonstrate that the effect of MHPC bulk density on the ability to prepare fluid polymer suspensions with 20% by weight MHPC or greater content is extendable to a broad number of salts. The functional salts useful for preparing the fluid pourable suspensions of high bulk density MHPC are thought to include, but are not necessarily limited to, salts of sodium, potassium or ammonium cations associated with either monovalent or multivalent anions.

TABLE 6

MHPC Suspension In Aqueous Potassium Chloride Solution

| Test Number | 1 | 2 | 3 |
|---|---|---|---|
| Polymer Tested | Methocel 240S | Culimnal 20,000PFR | Methocel 856S |
| Polymer Lot | 88042902W | 6962-0200 | 88011302JS |
| Ploymer Bulk Density | 0.31 | 0.27 | 0.49 |
| Polymer, Parts | 20 | 20 | 20 |
| Water, Parts | 55.9 | 55.9 | 55.9 |
| Xanthan, Parts | 0.1 | 0.1 | 0.1 |
| Salts, Parts | 24 | 24 | 24 |
| Pourable Suspension | Yes | No | Yes |

TABLE 7

MHPC Suspension In Aqueous Sodium Sulfate Solution

| Test Number | 1 | 2 | 3 |
|---|---|---|---|
| Polymer Tested | Methocel 240S | Culminal 20,000PFR | Methocel 856S |
| Polymer Lot | 88042902W | 6962-0200 | 88011302JS |
| Polymer Bulk Density | 0.31 | 0.27 | 0.49 |
| Polymer, Parts | 20 | 20 | 20 |
| Water, Parts | 70.9 | 70.9 | 70.9 |
| Xanthan, Parts | 0.1 | 0.1 | 0.1 |
| Salts, Parts | 9 | 9 | 9 |
| Pourable Suspension | Yes | No | Yes |

TABLE 8

MHPC Suspension In Aqueous Dibasic Potassium Phosphate Solution

| Test Number | 1 | 2 | 3 |
|---|---|---|---|
| Polymer Tested | Methocel 240S | Culminal 20,000PFR | Methocel 856S |
| Polymer Lot | 88042902W | 6962-0200 | 88011302JS |
| Polymer Bulk Density | 0.31 | 0.27 | 0.49 |
| Polymer, Parts | 20 | 20 | 20 |
| Water, Parts | 64.9 | 64.9 | 64.9 |
| Xanthan, Parts | 0.1 | 0.1 | 0.1 |
| Salts, Parts | 15 | 15 | 15 |
| Pourable Suspension | Yes | No | Yes |

EXAMPLE 6

A sample of MHEC 15,000 PFF, Lot 2592, methylhydroxyethylcellulose was measured to have a bulk density of 0.47 grams per cubic centimeter. It was attempted to prepare a fluidized polymer suspension of MHEC 15,000 PFF by mixing the following ingredients in sequence: 0.1 part by weight of xanthan gum was dissolved with stirring for two hours in 52.3 parts by weight of water, then 27.5 parts by weight of sodium formate were dissolved in the water with stirring. After the sodium formate had dissolved, 20 parts by weight of MHEC 15,000 PFF were added to the sodium formate solution and stirred to disperse. The polymer was observed to disperse in the solution without becoming excessively thick. Finally, 0.1 part by weight of Proxel GXL preservative was added to the water and stirred. A fluid pourable suspension was observed.

EXAMPLE 7

The lot of Benecel M043 from Comparative Example B was ground mechanically in a Brinkman Centrifugal Grinding Mill 0.2 mm Pore Size Screen laboratory grinder then passed through a U.S. 270 mesh screen. The resulting ground polymer sample had a measured bulk density of 0.33 grams/cc. It was attempted to prepare a fluidized polymer suspension of the finely ground Benecel® M043 employing the same method of Example 1. In this case, it was found that a viscous pourable suspension was observed. The suspension was found to pour with shaking. This example showed that by increasing the bulk density of methylcellulose to greater than 0.3, a fluidized polymer suspension could be prepared with the high bulk density material whereas the equivalent polymer in low bulk density form from Comparative Example B was ineffective for preparing the FPS with 20% polymer solids or greater.

Comparative Example B

A sample of Benecel® M043 methylcellulose, lot 6466, was measured to have a bulk density of 0.29 grams per cubic centimeter. It was attempted to prepare a fluidized polymer suspension of this product by the equivalent method of Example 1. However, in the case of the Benecel M043 methylcellulose, a fluid pourable suspension was not observed but instead a thick paste was the result of the procedure. This example showed that employing methylcellulose with a bulk density of less than 0.3 grams/cc, a fluid pourable suspension could not be obtained at a polymer solids content of 20% by weight or greater.

While the invention has been described with respect to specific embodiments, it should be understood that they are not intended to be limiting and that many variations and modifications, particularly of the salt used, are possible without departing from the scope and intent of this invention.

What is claimed is:

1. An aqueous fluidized polymer suspension comprising at least 20% by total weight of the suspension of at least one polymer selected from the group of methylcellulose, methylhydroxypropylcellulose, and methylhydroxyethylcellulose polymer, the polymer having a bulk density of 0.30 g/cc or greater, dispersed in an aqueous solution of at least one salt dissolved therein.

2. The aqueous fluidized suspension of claim 1 wherein the bulk density of the polymer is greater than 0.35 g/cc.

3. The aqueous fluidized suspension of claim 1 where the suspension is stabilized with xanthan gum.

4. The aqueous fluidized suspension of claim 1 where the salt is selected from the group of sodium, potassium and ammonium cations associated with either monovalent or multivalent anions.

5. A method of preparing an aqueous fluidized polymer suspension of methylcellulose, methylhydroxypropylcellulose, and methylhydroxyethylcellulose polymer, having a bulk density of 0.3 g/cc or greater, comprising dissolving a salt in water to form a salt solution and then suspending such polymer in the salt solution to form a dispersion with a high solids content of 20% by weight or greater.

6. A method of preparing a joint compound with greater than 50% adhesion to wall board tape comprising adding the aqueous fludized suspension of claim 1 to a joint compound formulation.

* * * * *